United States Patent
Grandemange et al.

(10) Patent No.: US 9,322,724 B2
(45) Date of Patent: Apr. 26, 2016

(54) ALGORITHM FOR DETECTING ACTIVATION OF A PUSH BUTTON

(75) Inventors: Eric Grandemange, Strasbourg (FR); Pierre-Benoit Prud'Homme, Strasbourg (FR); Etienne Aufrere, Geispolsheim (FR); Quang Huong, Erstein (FR)

(73) Assignee: Delphi Technologies, Inc., Troy, MI (US)

( * ) Notice: Subject to any disclaimer, the term of this patent is extended or adjusted under 35 U.S.C. 154(b) by 674 days.

(21) Appl. No.: 13/808,613

(22) PCT Filed: Jul. 7, 2011

(86) PCT No.: PCT/EP2011/061560
§ 371 (c)(1),
(2), (4) Date: Jan. 22, 2013

(87) PCT Pub. No.: WO2012/004370
PCT Pub. Date: Jan. 12, 2012

(65) Prior Publication Data
US 2013/0218488 A1    Aug. 22, 2013

(30) Foreign Application Priority Data

Jul. 7, 2010 (EP) .................................. 10006987

(51) Int. Cl.
| | | |
|---|---|---|
| *G01L 1/00* | (2006.01) | |
| *G01L 1/20* | (2006.01) | |
| *G01L 25/00* | (2006.01) | |
| *G06F 3/023* | (2006.01) | |
| *G01L 3/00* | (2006.01) | |

(52) U.S. Cl.
CPC . *G01L 1/20* (2013.01); *G01L 25/00* (2013.01); *G06F 3/023* (2013.01)

(58) Field of Classification Search
CPC ........................................................ G01L 25/00
See application file for complete search history.

(56) References Cited

U.S. PATENT DOCUMENTS

| | | |
|---|---|---|
| 5,252,971 A | 10/1993 | Franz et al. |
| 5,345,807 A | 9/1994 | Butts et al. |
| 5,515,040 A * | 5/1996 | Lee .................... G01L 25/00 340/870.04 |
| 6,456,952 B1 | 9/2002 | Nathan |
| 2006/0071912 A1 | 4/2006 | Hill et al. |
| 2006/0293864 A1 | 12/2006 | Soss |
| 2007/0107487 A1 | 5/2007 | Ariyur et al. |
| 2008/0167832 A1 | 7/2008 | Soss |
| 2009/0066673 A1 | 3/2009 | Molne et al. |

* cited by examiner

FOREIGN PATENT DOCUMENTS

| | | |
|---|---|---|
| EP | 0 535 907 | 4/2003 |
| EP | 1 602 907 | 12/2005 |
| WO | 2006/135483 | 12/2006 |

OTHER PUBLICATIONS

International Search Report dated Oct. 28, 2011.

*Primary Examiner* — Phuong Huynh
(74) *Attorney, Agent, or Firm* — Lawrence D. Hazelton (57) ABSTRACT

The invention relates to an algorithm for detecting activation of a tactile pressure sensor having a mechanic structure that includes the steps of: (a) measuring periodically an input quantity (V0; f0) of the sensor, when it is not pressed, the period being set according to sensor dynamic requirements; (b) computing a current idle quantity (Vidle; fidle) depending on the input quantity (V0; f0) measured at step a); (c) computing an activation threshold ($\Delta$VP; $\Delta$fP) based on a quantity characterization of the sensor mechanic structure and depending on the idle quantity (Vidle; fidle) defined at step b); (d) comparing the sensor input quantity (V0; f0) with the last defined idle quantity (Vidle; fidle) increased by the activation threshold ($\Delta$VP; $\Delta$fP) computed in step c) in order to determine whether the sensor is pressed or not.

14 Claims, 8 Drawing Sheets

Push button 1    Push button 3

Push button 2    Push button 4

Expected
action

Push button 1    Push button 3

Push button 2    Push button 4

Unexpected
action

Pressed area

Push detected as pressed

ALGORITHM FOR DETECTING ACTIVATION OF A PUSH BUTTON

CROSS-REFERENCE TO RELATED APPLICATION

This application claims the benefit under 35 U.S.C. §371 of published PCT Patent Application Number PCT/EP 2011/061560, filed Mar. 24, 2011, claiming priority to European Patent Application Number EP10006987.1 filed on Jul. 7, 2010, and published as WO2012/004370 on Jan. 12, 2012, the entire contents of which is hereby incorporated by reference herein.

TECHNICAL FIELD OF INVENTION

The present invention relates to an algorithm for detecting activation of a push button comprising a tactile pressure sensor. Such algorithm is applicable to all products that contain FORCE SENSING RESISTOR® (FSR®) technology working in preloaded condition and how to control the force to detect sensor activation through a rigid mechanical part (e.g. detect activation above a specified actuation force, regardless the velocity of the actuation).

BACKGROUND OF INVENTION

FSR® Integration Guide & Evaluation Parts Catalog With Suggested Electrical Interfaces, which is enclosed herewith by reference, provides an overview of the FSR® technology along with some basic electrical interfaces using such FSRs. In particular, FIG. 17 of this document (i.e.—the FSR® document) shows an FSR® current-to-voltage converter described by Eq. 1.

$$V_{OUT} = V_{REF}/2 \times [1 + RG/R_{FSR}]$$  Eq. 1

Another example is given in FIG. 18 of this document showing a simple force to frequency converter with an FSR® device as the feedback element around a Schmitt trigger. At zero force, the FSR® is an open circuit. Depending on the last stage of the trigger, the output remains constant, either high or low. When the FSR® is pressed, the oscillator starts, its frequency increasing with increasing force.

It is known from document WO 2009/070503, use of a force sensing resistor where an FSR® output which is a function of the resistance is measured. Whether a change in magnitude of the FSR® output during a time interval is greater than a threshold is determined. A touch applied on the FSR® is detected during the time interval if the change is greater than the threshold. This document nevertheless presents some drawbacks among with the fact that the FSR® is a pre-loaded sensor that does not take into account the environment in which the FSR® is integrated decreasing the reliability of the detection of the FSR® activation.

It is also known from the document U.S. Pat. No. 5,440,237, a method and apparatus for normalizing electronic sensor data to correct for variations in individual sensor transfer characteristics that are not known in advance. A general characteristic transfer function of sensor type of interest is determined empirically. For that purpose, a baseline response is acquired from each sensor to get an indication of the transfer characteristics of each individual device. The baseline response is determined under some "preloaded" condition or "at rest" condition. Then a specific transfer function is determined for each individual sensor by applying the corresponding baseline response to the general characteristic transfer function. As for the previous document, it results from the above method that detection of the sensor activation does not take into account the environment of the sensor.

It is also known from the document US 2006/007172, a force sensing resistor with a calibration feature. For that purpose, it comprises the steps of measuring a calibration resistance while the FSR® is disconnected and determining a correction factor such that it is the ratio between the nominal value and the current measured value. Subsequent measurements of the FSR® resistance are then multiplied by the correction factor in order to scale them to appear as if they were measured from a nominal FSR® resistance.

In existing solutions, electronic measures, through a microprocessor Analogic Digital Converter (ADC), a voltage or frequency that will be the image of the FSR® resistance/pressure. As the FSR® resistance variation is assumed to follow a 1/F law, F being the force applied, thus the output voltage or frequency is a straight line as shown on FIGS. 1B and 1C.

Figure 1A:
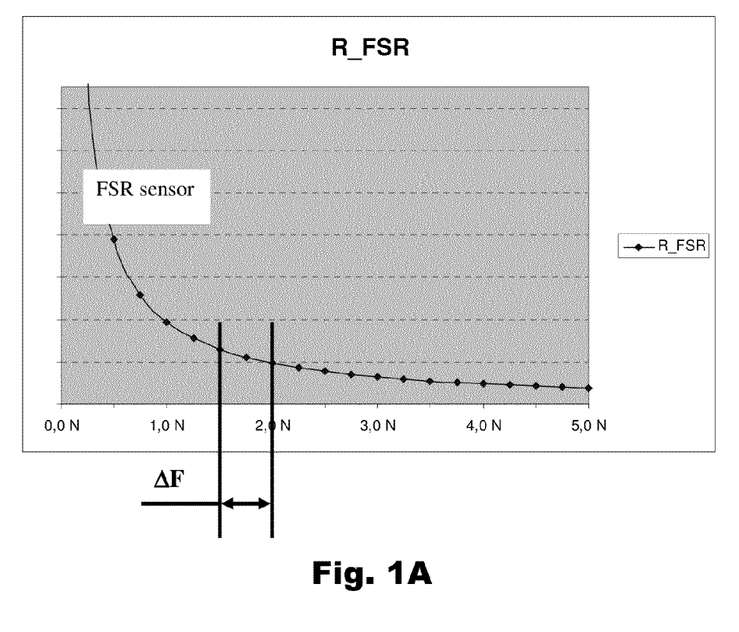
FIG. 1A, already described, is a graphic showing the relation between pressure applied on FSR® and its resistance.
Figure 1B:
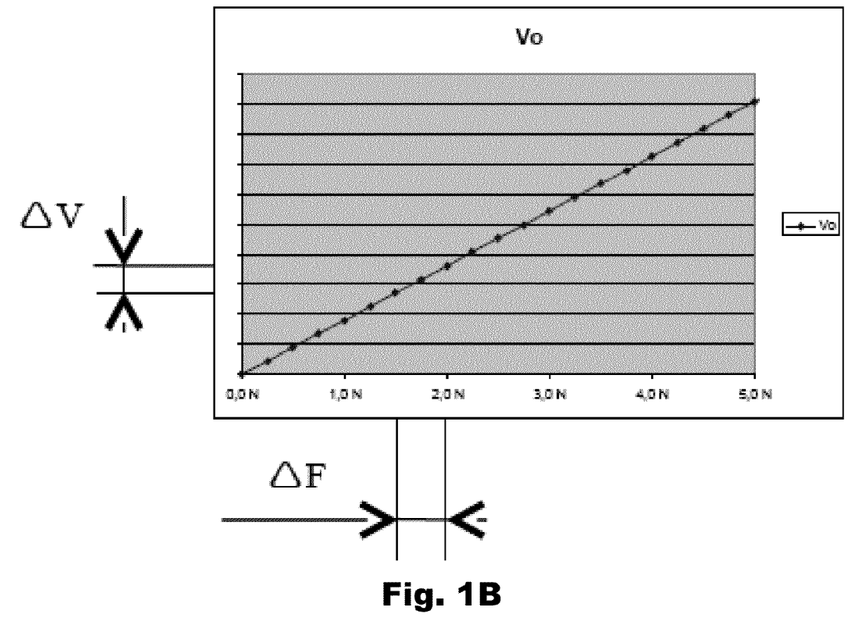
FIG. 1B, already described, is a graphic showing the relation between pressure applied on FSR® and voltage variation.
Figure 1C:
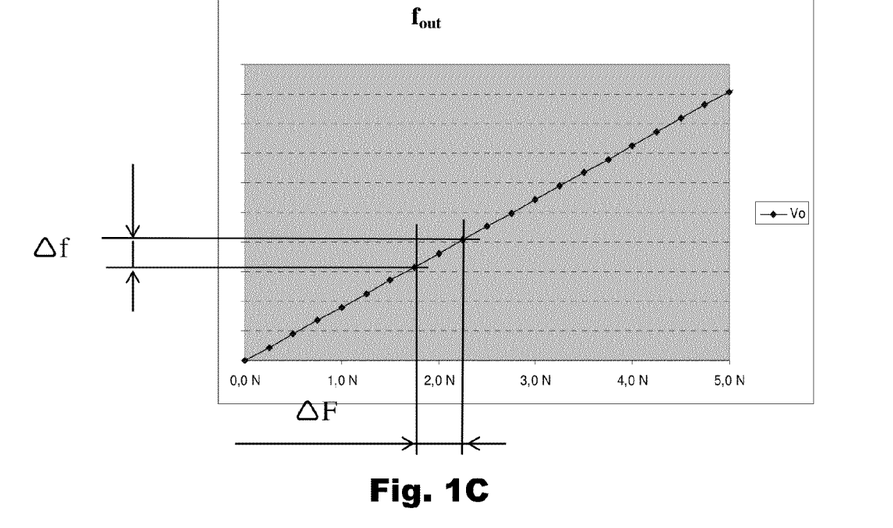
FIG. 1C, already described, is a graphic showing the relation between pressure applied on FSR® and frequency variation.

The relation between the pressure applied on FSR® and the resistance variation is given on FIG. 1A. Therefore, theoretically whatever the resistance is, for a constant force $\Delta F$, there is constant voltage $\Delta V$ as shown in FIG. 1B or a constant frequency $\Delta f$ as shown in FIG. 1C.

Mainly used algorithms are generally based on high pass filter with long time constant (16 samples@20 ms sampling period). Further, the output value of this filter that depends on the velocity and force of the actuation is compared to thresholds for detecting any change on the sensor.

Another document, US 2009/066673, describes a self-calibration method of a pressure sensor. This method consists in periodically calibrating the sensor when not activated, determining an idle tension according to the current and previous values, compensating the measured value by compensation data and activating the sensor according to an updated threshold value. The compensation data may be in particular the relation between the measured voltage and the force applied on the sensor.

It is further known from the document U.S. Pat. No. 5,514,040 calibration methods of FSR® sensors. One of these methods is based on a delay value calibration, while another one is based on an adjustment value calibration. However, none of these methods takes into account the state of the push (released or pressed) and the mechanic structure of the sensor to make the calibration. Another document EP 0535907 describes a calibration method of a push button based on a measure done while the button is pressed by the user. Another document U.S. Pat. No. 6,456,952 describes a calibration method of a touch screen including key areas and drift areas. Following the detection of contacts in key areas and surrounding drift areas, an adjustment vector is applied to focus detection. Still another document, EP 602907 describes a calibration method based on two extreme measures, one measure without pressure and another measure with a maximum pressure. Finally, another document US 2007/107487 describes a generic calibration method.

Each of the above presented solutions present some of the following several drawbacks. In particular, the above presented systems will be influenced by electromagnetic interference (EMI)/compatibility (EMC). Indeed, protection stage against automotive EMI/EMC constraint will influence the voltage input value. Consequently, the input voltage is no more linear over the whole $R_{FSR®}$ variation range. Further, the mechanical environment, temperature and humidity have an influence on the mechanical pre-load system and FSR® intrinsic characteristics. Indeed, FSR® resistance variation is not really in $1/x$, but in $z/x$ (with $0.5 < z < 1.5$) due to the mechanical structure of the sensor which is not a straight line over the whole resistance variation range. Moreover, it appears that high dynamic pressure detection is not reliable since with a high pass filter, the low velocity activation cannot be detected (actuation duration has to be less than the time constant, which may be not compliant with sensor requirements). Known algorithms do not take into account dynamic variation of preload detection. Indeed, due to mechanical warping on mechanical parts or on the FSR® sensor itself, the preload applied on the sensor can dynamically change. For instance, between two consecutive presses, the FSR® resistance level may change. Furthermore, current solutions do not take into account fast variations of the system such as dynamic variation of preload detection due to mechanical warping on the sensor that may change the for instance the sensor resistance level between two presses.

SUMMARY OF THE INVENTION

One goal of the present invention is to overcome the aforecited drawbacks by providing an algorithm for reliably detecting activation of a tactile pressure sensor with a strength activation management for which over a strength threshold a sensor activation has to be detected regardless the stroke velocity and possible fast variations of the system.

For that purpose, according to a first aspect, the invention concerns an algorithm for detecting activation of a tactile pressure sensor with a mechanic structure comprising the steps consisting of: a) measuring periodically an input quantity of the sensor, when it is not pressed, the period being set according to sensor dynamic requirements; b) computing a current idle quantity depending on the input quantity measured at step a); c) computing an activation threshold based on a quantity characterization of the sensor mechanic structure and depending on the idle quantity defined at step b); d) comparing the sensor input quantity with the last defined idle quantity increased by the activation threshold computed in step c) in order to determine whether the sensor is pressed or not.

Such algorithm has the advantage of ensuring reliable detection of activation of the sensor while with a very shirt overall processing delay and extended resistance value range monitoring. Further, period setting according to sensor dynamic requirements allows to discriminate between slow user actuations and fast environment changes.

According to another embodiment, the quantity measured at step a) is the input frequency defining a current idle frequency at step b) and computing an activation threshold based on a frequency characterization of the sensor mechanic structure and depending on the idle frequency defined at step b). Such algorithm provides the ability to use sensors far from the processing unit and to increase the acceptable dynamic range.

According to another embodiment, the quantity measured at step a) is the input voltage defining a current idle voltage at step b) and computing an activation threshold based on a voltage characterization of the sensor mechanic structure and depending on the idle voltage defined at step b).

According to another embodiment, the period at step a) is dynamically set upon detection of environmental constraint changes. Such dynamic setting of the measurement period in step a) ensures auto-adaptation to fast variations of the system constraints as well as environmental changes such as mechanical preload, temperature or humidity. Advantageously, the period is dynamically set to a fast period mode defined by a shorter period, when either a push has been detected as released or the idle quantity has dropped under a predetermined threshold.

According to another embodiment, the idle quantity in step b) is defined as the average value between the previous defined value of the idle quantity and the last measured input voltage in step a).

According to another embodiment, the quantity characterization of the sensor mechanic structure is made all over the range of strength used by sensor.

According to another embodiment, the quantity characterization is made by way of an end of line tester or by a measurement done on several parts during the development.

According to another embodiment, computation in step c) is based on an equation of the sensor behaviour determined by the quantity characterization setting the activation threshold to be near the strength request for such activation.

According to another embodiment, computation in step c) is based on a correspondence table between the idle quantity determined at step b) and a corresponding activation threshold determined by the quantity characterization of the sensor mechanic structure.

According to another embodiment, step c) further consists in computing a non-activation threshold to determine when the sensor is released after having been pressed, said non-activation threshold being strictly lower than the activation threshold and preferably also under another strength threshold non-activation has to be detected. Advantageously, the non-activation threshold is either directly based on the activation threshold or computed from the quantity characterization of the sensor mechanic structure.

According to a second aspect, the invention concerns an algorithm for detecting activation of a tactile pressure sensor among a plurality of tactile pressure sensors being mechanically dependant on each other's, wherein in addition to the first aspect it further comprises the step of determining which sensor has been pressed by comparing for each sensor the gap between the sensor input quantity with the last defined idle quantity and selecting the sensor with the highest gap.

According to another embodiment, it further comprises the steps of calibrating each sensor and storing for each sensor a quantity deviation for a given force applied, said quantity deviation being used for computing the activation threshold at step b).

According to another embodiment, it further comprises the step of adjusting the actuation threshold based on a temperature characterization of each sensor mechanic structure.

According to another embodiment, each gap computation is adjusted by a predetermined coefficient for each sensor based on their stored quantity deviation and/or their temperature characterization. According to an advantageous embodiment, the periodicity in step a) is set according to sensor dynamic requirements in order to discriminate between slow user actuations and fast environment sensor changes.

According to another aspect, the invention concerns a push button comprising a tactile pressure sensor controlled by the algorithm according to the first aspect.

According to another embodiment, it concerns a plurality of push buttons each comprising a tactile pressure sensor controlled by the algorithm according to the first aspect Further features and advantages will appear more clearly on a reading of the following detailed description of the preferred embodiment, which is given by way of non-limiting example only and with reference to the accompanying drawings.

BRIEF DESCRIPTION OF DRAWINGS

Other features and advantages of the invention will appear upon reading the following description which refers to the annexed drawings in which.

DETAILED DESCRIPTION

With reference now to FIGS. 2 to 8, we will describe in more details several embodiments of algorithms for detecting the activation of a tactile pressure sensor. In order to fulfill system requirements and be independent of product use context, it is proposed to use an algorithm that has to: be independent of the environment constraints (mechanical pre-load, temperature and humidity) by computing an idle quantity provided by the electronic stage when the push is not pressed; adapt the activation/non-activation thresholds to the processed idle quantity, to take into account the non-linearity of the system, over the whole range of the sensor resistance variation; and determine the push state (pressed or released) by comparing the input quantity to the idle quantity and to the computed actuation thresholds.

Figure 2:
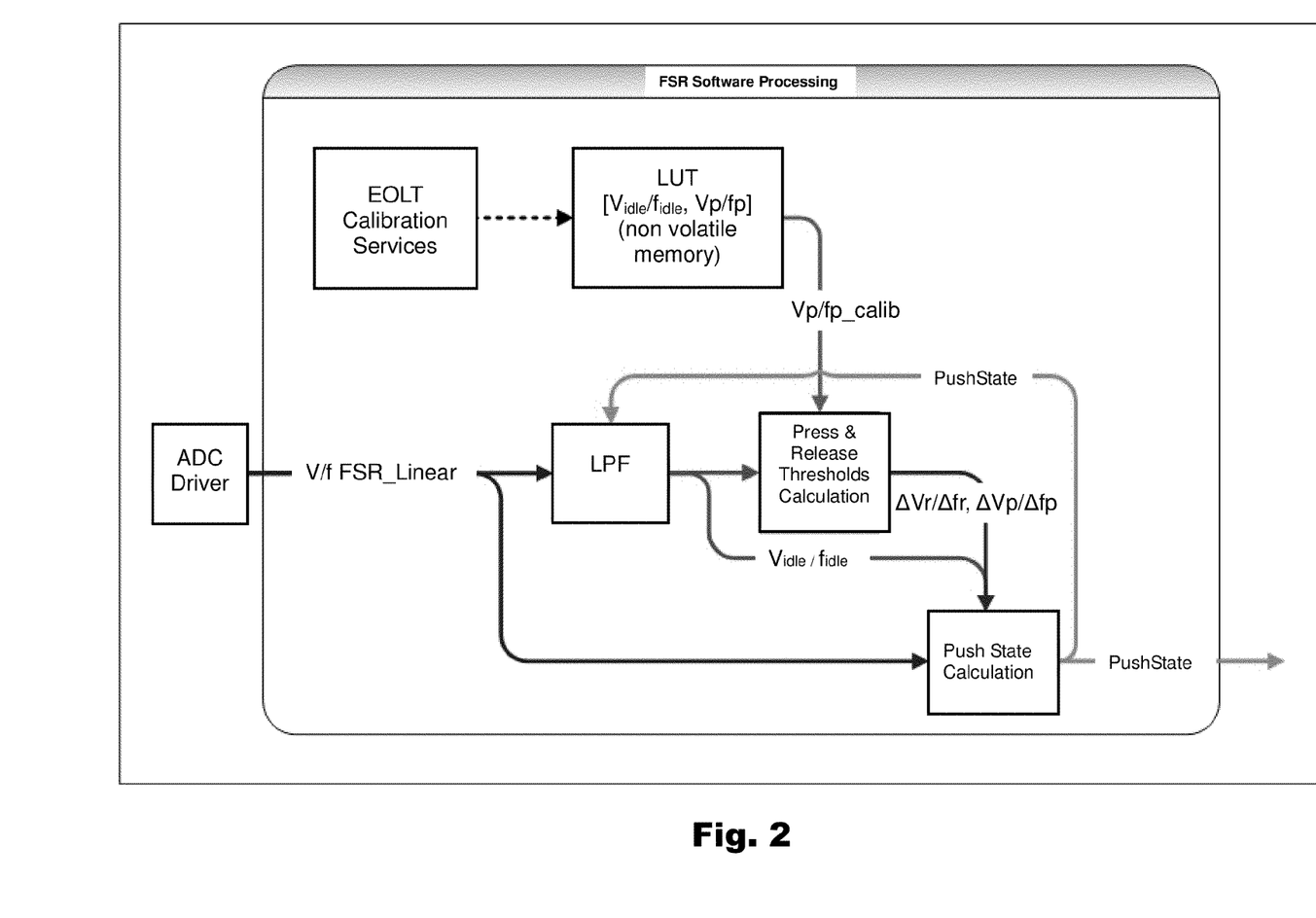
FIG. 2 represents the sensor processing means according to an embodiment of the invention.

As it can be seen on FIG. 2, it represents schematically the sensor processing means. An input quantity such as a voltage (V0) or a frequency (f0) will be periodically measured at the input (V/f_FSR_Linear) of an analogic to digital converter (ADC Driver) for a voltage or of a timer input for a frequency. In order to define a current idle quantity (Vidle; fidle) depending on the measured input quantity when the sensor is not pressed, it is provided with filtering means such as a low-pass filter (LPF) for filtering said input quantity. It further comprises press and release threshold calculation means for computing an activation threshold ($\Delta VP$; $\Delta fP$) for detection when the sensor is pressed and also preferably a non-activation threshold ($\Delta VR$; $\Delta fR$) for detection when the sensor is released based on this defined idle quantity and on a corresponding quantity characterization of the sensor mechanic structure. This quantity characterization can be done by design, during development, or directly with or by the product, at the end of line tester (EOLT) calibration services. A look up table (LUT), or an equation of the variation law, may be used to compute the thresholds. Finally it comprises push state calculation means comparing the sensor input quantity (V0, f0) with the last defined idle quantity (Vidle; fidle) and the activation/non-activation thresholds ($\Delta VP/\Delta VR$, $\Delta fP/\Delta VfR$) in order to determine whether the sensor is pressed or not. At the output, a push state is delivered.

Figure 3:
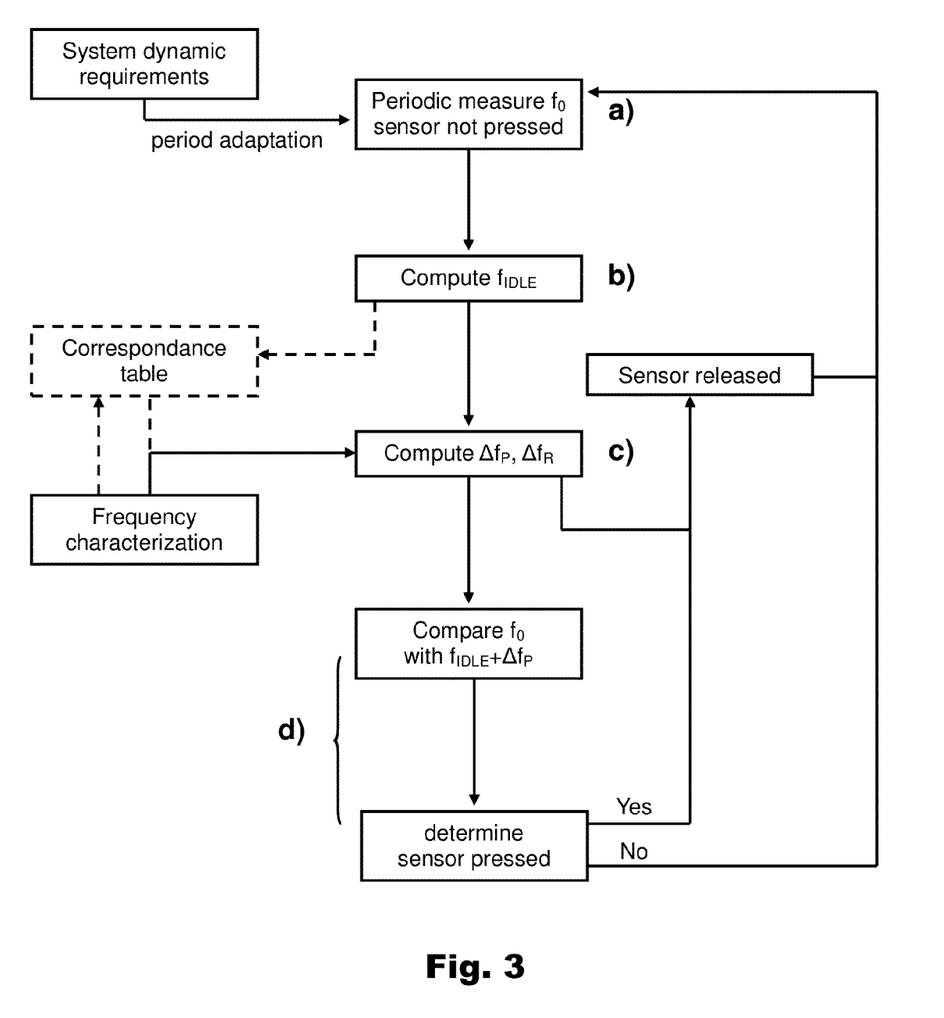
FIG. 3 represents a diagram of the algorithm for detecting activation of a tactile pressure sensor according to a first embodiment.

According to a first embodiment, it is provided to use a FSR® driver that generates a periodic square signal which frequency is related to 1/RFSR. Frequency acquisition has preferably to be performed by a microprocessor thanks to an input capture pin. In this case, FSR® driver supplies a digital output, which is much more robust to EMC perturbations and permits to use remote sensors. There is no more limitation due to the operational amplifier output saturation voltage and so the dynamic range is increased. FIG. 3 represents a diagram of the algorithm for detecting activation of a tactile pressure sensor based on a frequency quantity acquisition.

A first step a) consists in measuring periodically the input frequency (f0) of the sensor when it is not pressed.

A second step b) consists in processing the idle frequency based on the input frequency measured at step a). The level of the idle frequency fidle(t) is periodically updated in order to be auto-adaptive against the environment constraint. Thus, a periodic task with a long period shall apply a low-pass filter, preferably of the first order, to the input frequency (f0), only when the sensor is detected as released. The period of the fidle calculation shall be set according to the system dynamic requirements, i.e. period value shall be able to discriminate between slow user actuations and fast environment system changes. For that purpose, the output of the 1st order low pass filter is advantageously given by Eq. 2

$$fn\text{idle}=(fn-1\text{idle}+fn0)/2 \qquad \text{Eq. 2}$$

A third step c) consists in computing actuation thresholds according to the idle frequency defined at step b). For that purpose, it is provided to use a frequency characterization of the sensor mechanic structure, shown at FIG. 6A. To let the system less sensitive to EMI filtering, mechanic structure and sensor technology influence, it is proposed to make a frequency characterization of the mechanic structure, all over the range of strength used by the system and implement it on the software. This characterization can be done by design, during development, or directly with or by the product, at an end of line tester calibration services. With such characterization, it is possible to adapt the system non-linearity and to have an accurate value of the strength for the sensor activation or non-activation.

This characterization can be defined with an equation of the system behavior. The equation of the curve (FIG. 6A) is then programmed in a memory of the local user terminal and can define itself the $\Delta fP$ frequency requested depending on fidle. So, whatever the preload is, the system can manage the $\Delta fP$ and $\Delta fR$ frequency thresholds to be near the strength request for the activation or non-activation. The kinds of the equation used or its order define the precision of the system.

Figure 6A:
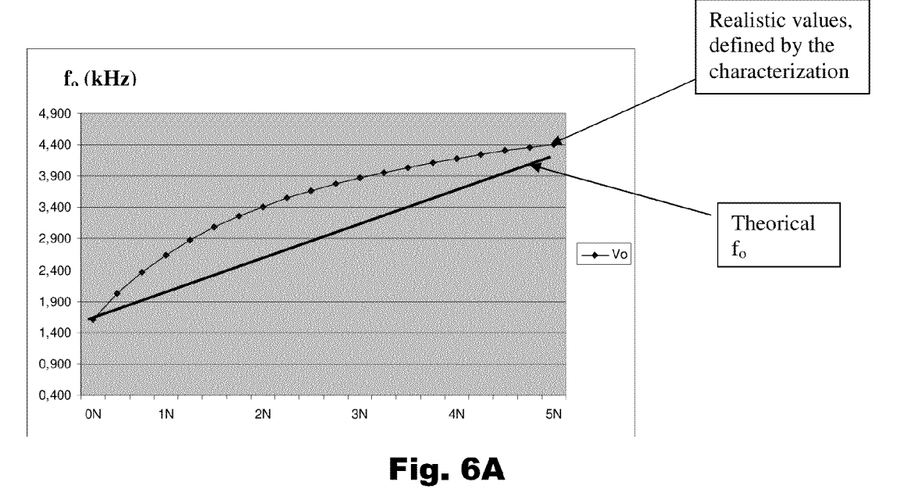
FIG. 6A represents the voltage characterization of the sensor mechanic structure.

Alternatively, the frequency characterization could be done in the form of a table of $\Delta fP$ and $\Delta fR$ values depending on fidle. The software will then adapt both threshold values $\Delta fP$ and $\Delta fR$ based on the fidle voltage of the sensor. An example of table is given below in Table 1.

TABLE 1

| $f_{idle}$ frequency (KHz) | $\Delta f_P$ (Hz) for sensor activation |
|---|---|
| $1.4 < f_{idle} < 1.6$ | 910 |
| $1.6 < f_{idle} < 2.35$ | 620 |

TABLE 1-continued

| $f_{idle}$ frequency (KHz) | $\Delta f_P$ (Hz) for sensor activation |
|---|---|
| $2.35 < f_{idle} < 2.87$ | 440 |
| $2.87 < f_{idle} < 3.25$ | 330 |
| $3.25 < f_{idle} < 3.54$ | 260 |
| $3.54 < f_{idle} < 3.77$ | 200 |
| $3.77 < f_{idle} < 3.96$ | 170 |
| $3.96 < f_{idle} < 4.12$ | 140 |
| $4.12 < f_{idle} < 4.24$ | 120 |
| $4.24 < f_{idle} < 4.35$ | 100 |
| $4.35 < f_{idle} < 4.45$ | 90 |

Depending on the accuracy needed, a table for $\Delta fR$ can also be done, otherwise, $\Delta fR$ can be calculated from $\Delta fP$. The deep of the tables define the precision of the system.

A fourth step d) consists in comparing the sensor input frequency (f0) with the last defined idle frequency (fidle) increased by the activation threshold ($\Delta fP$) in order to determine the push state, i.e. whether the sensor is pressed or not. An advantageous way of determining the push state is detailed below in relation with FIG. 7.

Figure 4:
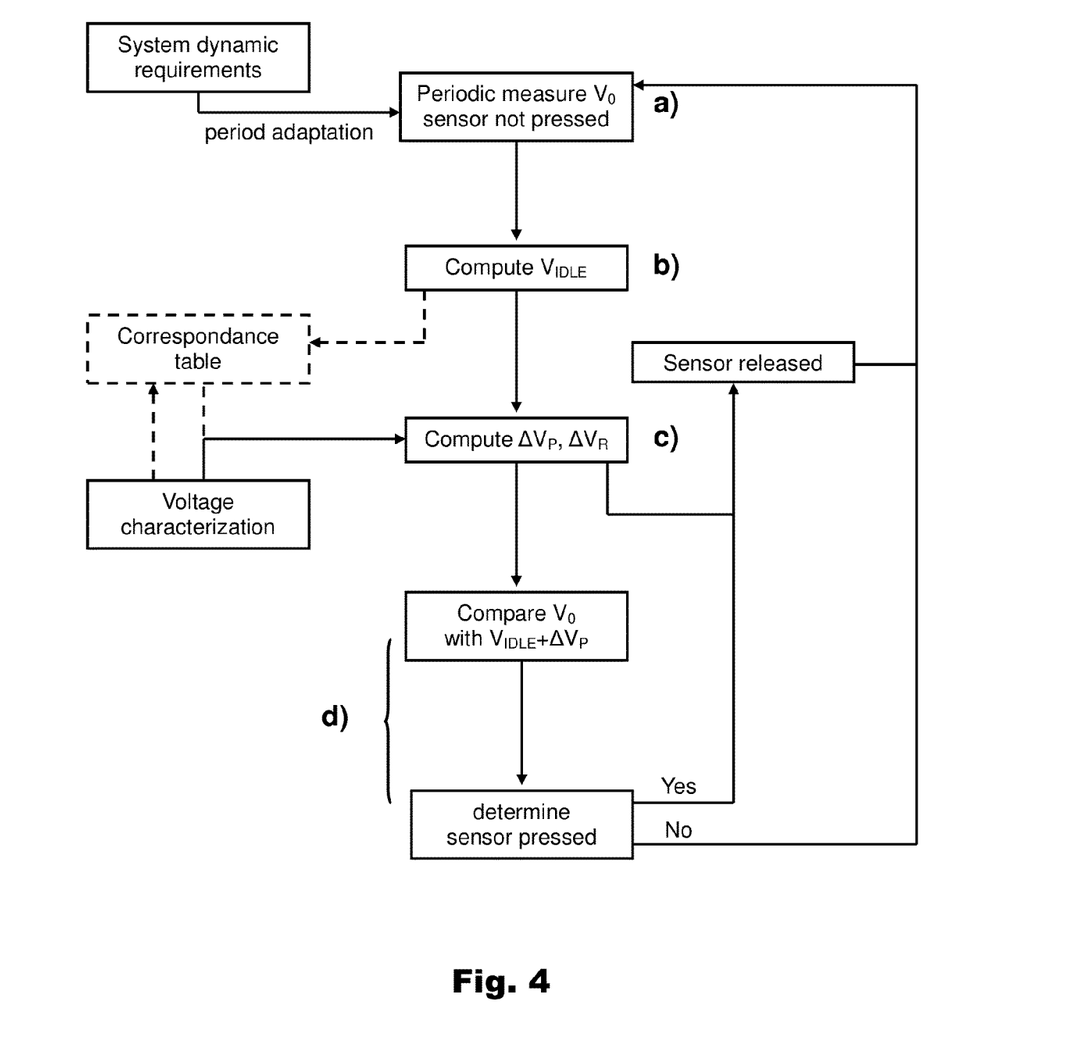
FIG. 4 represents a diagram of the algorithm for detecting activation of a tactile pressure sensor according to a second embodiment.

FIG. 4 represents a diagram of the algorithm for detecting activation of a tactile pressure sensor according to a second embodiment based on a voltage quantity acquisition. The algorithm is similar to the one of the first embodiment with the difference that voltages instead of frequencies are considered.

Step a) consists in measuring periodically the input voltage (V0) of the sensor when it is not pressed.

Step b) consists in processing the idle voltage based on the input voltage measured at step a). The level of the idle voltage Vidle(t) is periodically updated in order to be auto-adaptive against the environment constraint. Thus, a periodic task with a long period shall apply a low-pass filter, preferably of the first order, to the input voltage (V0), only when the sensor is detected as released. The period of the Vidle calculation shall be set according to the system dynamic requirements, i.e. period value shall be able to discriminate between slow user actuations and fast environment system changes. For that purpose, the output of the 1st order low pass filter is advantageously given by Eq. 3.

$$V\!nidle = (V\!n\text{-}1idle + V\!nO)/2 \qquad \text{Eq. 3}$$

Step c) consists in computing actuation thresholds according to the idle voltage defined at step b). For that purpose, it is provided to use a voltage characterization of the sensor mechanic structure, shown at FIG. 6B. To let the system less sensitive to EMI filtering, mechanic structure and sensor technology influence, it is proposed to make a voltage characterization of the mechanic structure, all over the range of strength used by the system and implement it on the software. This characterization can be done by design, during development, or directly with or by the product, at an end-of-line tester calibration services. With such characterization, it is possible to adapt the system non-linearity and to have an accurate value of the strength for the sensor activation or non-activation. More generally, with the characterization, it is possible to adapt the system non-linearity and to have an accurate value of the strength for the sensor activation or non-activation.

This characterization can be defined with an equation of the system behavior. The equation of the curve (FIG. 6) is then programmed in a memory of the local user terminal and can define itself the $\Delta VP$ voltage requested depending of Vidle. So, whatever the pre-load is, the system can manage the $\Delta VP$ and $\Delta VR$ voltage thresholds to be near the strength request for the activation or non-activation. The kinds of the equation used or its order define the precision of the system.

Figure 6B:
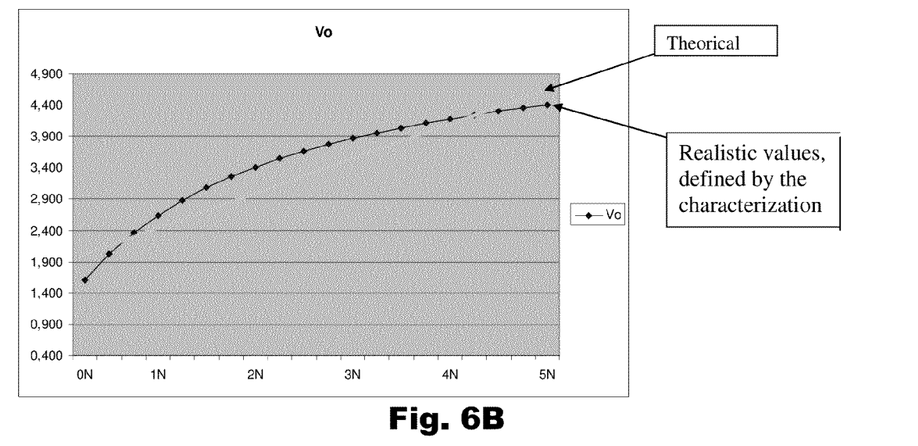
FIG. 6B represents the frequency characterization of the sensor mechanic structure.

Alternatively, the voltage characterization could be done in the form of a table of $\Delta VP$ and $\Delta VR$ values depending of Vidle. The software will then adapt both threshold values $\Delta VP$ and $\Delta VR$ based on the Vidle voltage of the sensor. The deep of the tables define the precision of the system. An example of table is given below in Table 2.

TABLE 2

| $V_{idle}$ voltage measured | $\Delta V_P$ Voltage to take into account for sensor activation |
|---|---|
| $1.4 < V_{idle} < 1.6$ | 0.91 |
| $1.6 < V_{idle} < 2.35$ | 0.62 |
| $2.35 < V_{idle} < 2.87$ | 0.44 |
| $2.87 < V_{idle} < 3.25$ | 0.33 |
| $3.25 < V_{idle} < 3.54$ | 0.26 |
| $3.54 < V_{idle} < 3.77$ | 0.2 |
| $3.77 < V_{idle} < 3.96$ | 0.17 |
| $3.96 < V_{idle} < 4.12$ | 0.14 |
| $4.12 < V_{idle} < 4.24$ | 0.12 |
| $4.24 < V_{idle} < 4.35$ | 0.1 |
| $4.35 < V_{idle} < 4.45$ | 0.09 |

Depending on the accuracy needed, a table for $\Delta VR$ can also be done, otherwise, $\Delta VR$ can be calculated from $\Delta VP$. The deep of the tables define the precision of the system.

A fourth step d) consists in comparing the sensor input voltage (V0) with the last defined idle voltage (Vidle) increased by the activation threshold ($\Delta VP$) in order to determine the push state, i.e. whether the sensor is pressed or not. An advantageous way of determining the push state is detailed below in relation with FIG. 7.

Figure 5:
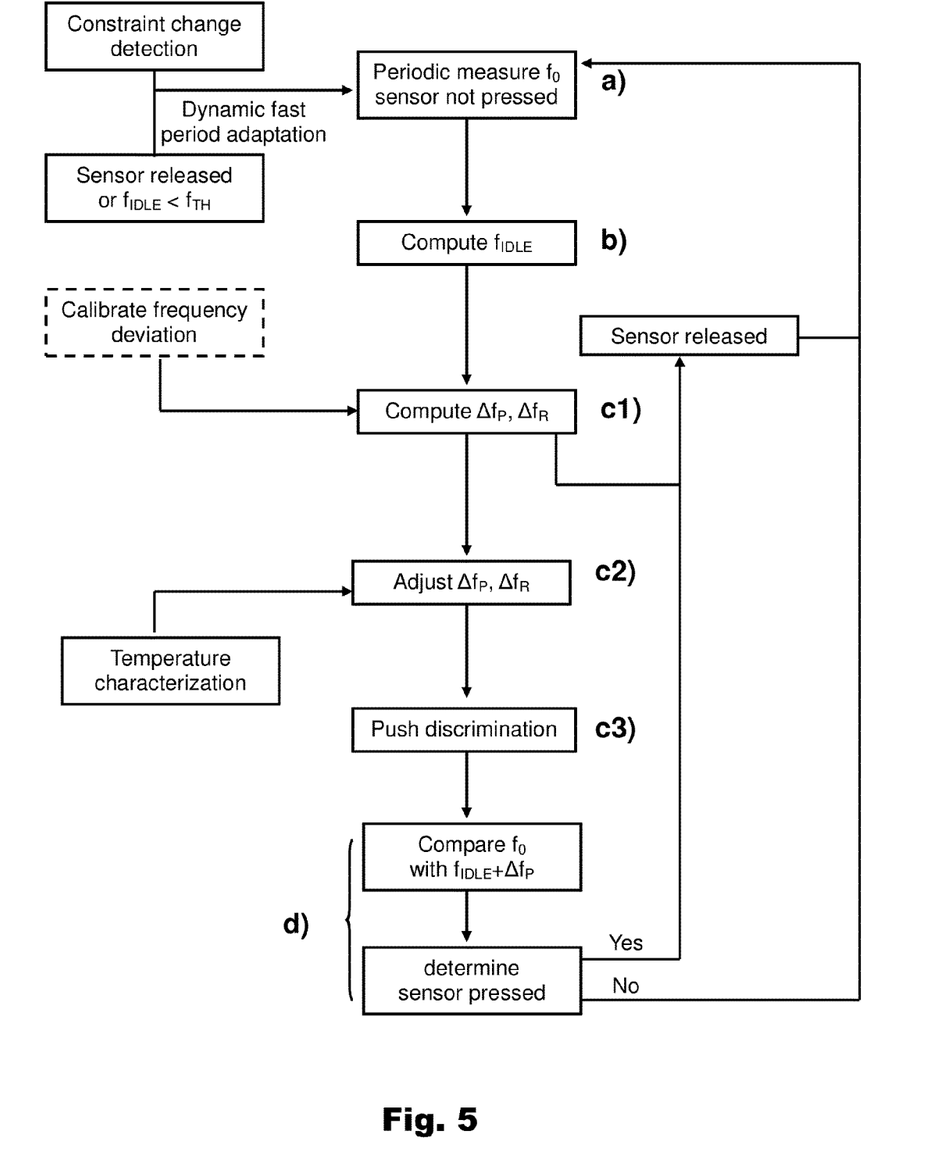
FIG. 5 represents a diagram of the algorithm for detecting activation of a tactile pressure sensor according to a third embodiment.
Figure 8:
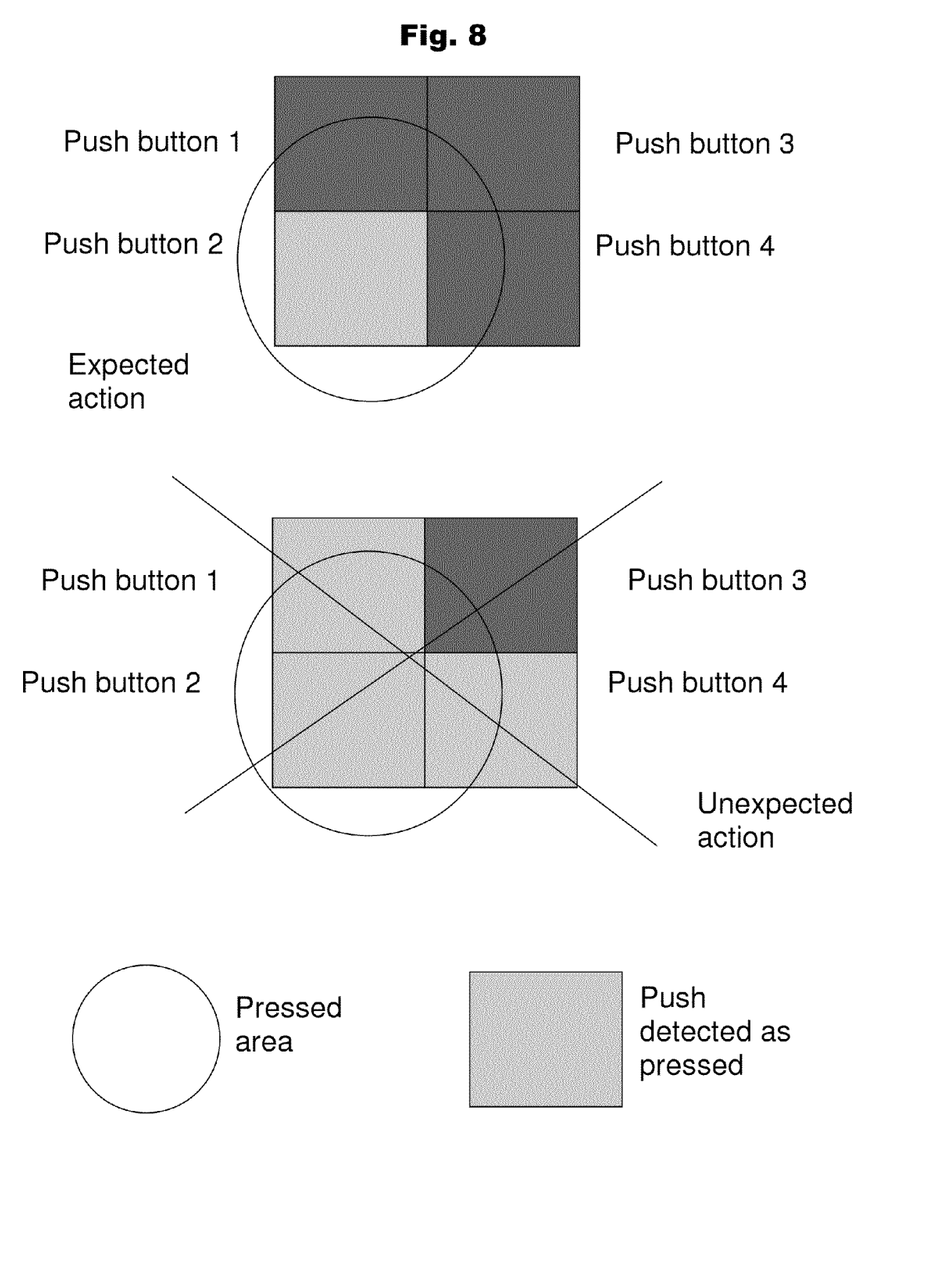
FIG. 8 shows a system comprising four neighbouring push buttons.

FIG. 5 represents a diagram of the algorithm for detecting activation of a tactile pressure sensor according to a third embodiment based on a frequency quantity acquisition and adapted to a system with a plurality of sensors as shown in FIG. 8.

A first step a) consists in measuring periodically the input frequency (f0) of the sensor when it is not pressed.

A second step b) consists in processing the idle frequency based on the input frequency measured at step a). The level of the idle frequency fidle(t) is periodically updated in order to be auto-adaptive against the environment constraints. For instance, due to mechanical constraint applied on the sensor or to mechanical geometry changes consecutive to a push actuation, the level of the preload seen by the sensor may quickly change and then the idle frequency may become inaccurate in case it is computed by a task with a long and static period. Thus, for preventing from inaccurate computation, this task period would preferably also be dynamically modifiable to a fast period in case of fast environmental change detection. The task is then activated in a "Fast Mode" in order for the system to adapt the idle frequency to the new environmental conditions. This "Fast Mode" is triggered either when an actuation has been detected as released, because the idle frequency may have changed after the press or when the idle frequency has suddenly dropped less than an adjustable threshold.

A third step c1) consists in computing actuation thresholds. The resistance variation is linearized by the electronic stage and provides a periodic signal, which frequency directly stands for the force applied on the film sensor. The slope of the line—Frequency (Hz) against Force (N)—is different from one push to the other one. It is therefore proposed to calibrate each push and store the frequency deviation for a given force applied in a non-volatile memory. Thus, it is possible to easily change the sensitivity of the system and make it possible to detect an actuation for a modifiable threshold.

A fourth step c2) consists in adjusting the actuation thresholds against temperature. To let the system less sensitive in temperature due to mechanic and sensor technology, it is proposed to make a characterization of the system structure over the range of temperature and implement it on the software. The resistance variation is linearized by the electronic stage and provides a periodic signal, which frequency directly stands for the force applied on the FSR® film sensor. Only the slope of this line depends on the temperature as shown on FIG. 6C.

Figure 6C:
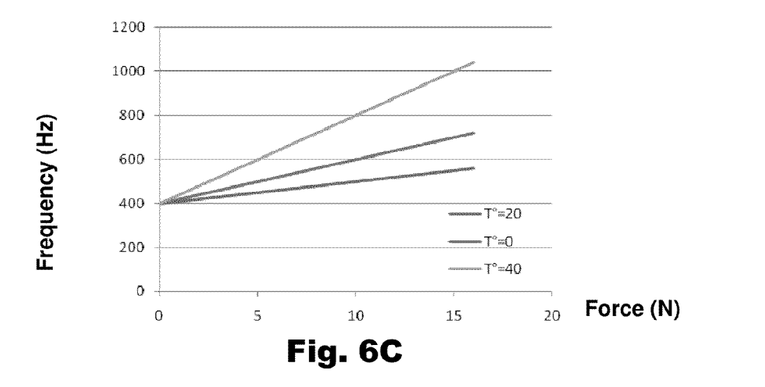
FIG. 6C represents the frequency characterization of the sensor against temperature.

The variation of the slope according to the temperature may be integrated by the algorithm via a curve stored in a non-volatile memory, and the standard frequency deviation given for a known force (stands for the slope of the line at a nominal temperature) is also stored in the memory and can be specific for each sensor or plurality of sensors depending on the mechanical structure. Then the actuation threshold is given by the standard frequency deviation multiplied by an adjustment coefficient for the temperature. This coefficient depending on the temperature could be provided by a table of data. This table can also be stored in a non-volatile memory and be adapted according the film behavior.

In case of a multi push system, it is further provided an intermediary discrimination step c3) prior to determination of a push state, which consists in discriminating which sensor is pressed among the plurality of sensors through a discrimination process. In case of use of multiple pushes that are mechanically dependent on each other, it is proposed to discriminate the sensor (i.e. push) which the maximum force is applied on. To know which sensor is being actuated, computation of the difference between the current frequency and the idle frequency (which stands for the current force applied and the preload applied in idle position) is done. This difference is computed for each push of the system and is adjusted by a coefficient, which stands for the transmission rate of the mechanical structure surrounding the sensor on the film. This coefficient (for each push) is highly linked with the mechanic and is preferably fixed since the mechanical structure is known and characterized. The calculation follows Eq. 4 for each push number n:

$$\Delta f = |fn0 - Fn\text{idle}| \times \text{Coef } n \qquad \text{Eq. 4}$$

The discrimination consists in finding the push number n, which is maximizing this $\Delta f$.

A sixth step d) consists in comparing the sensor input frequency (f0) with the last defined idle frequency (fidle) increased by the activation threshold ($\Delta fP$) in order to determine the push state, i.e. whether the sensor is pressed or not. An advantageous way of determining the push state is detailed below in relation with FIG. 7. It is further provided to detect any fast change in environmental conditions, such as fast frequency drop and manual handling (consecutive to a push press for instance). In those conditions, the mechanical influence on the sensor can change, for instance modification of preload distribution between all pushes. Then, in case of fast change detection, the algorithm will trigger the "Fast Mode" provided in step a).

Figure 7:
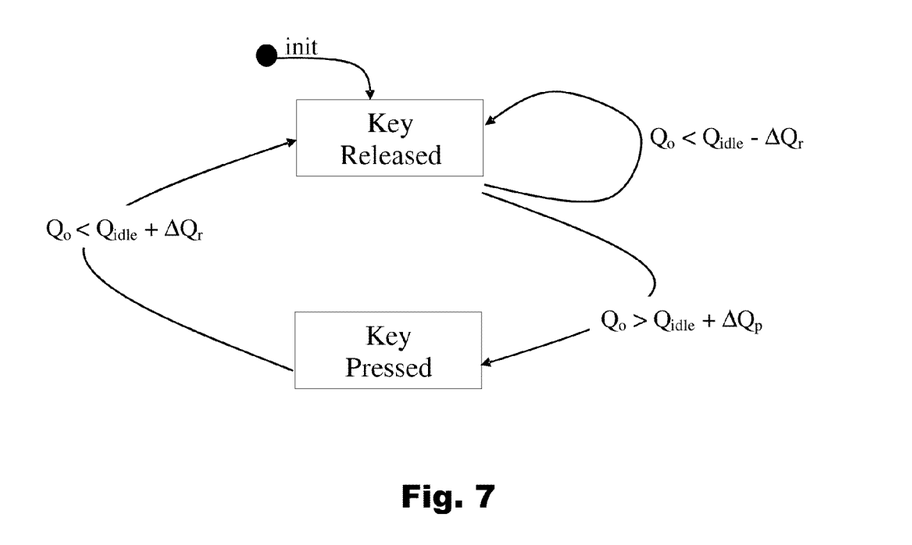
FIG. 7 represents a schematic showing the comparisons between the input quantity and the computed thresholds according to any of the three embodiments.

FIG. 7 represents a schematic showing the comparisons between the input quantity Q0 (being either V0 or f0) and the computed thresholds $\Delta QP/\Delta QR$ (either $\Delta VP/\Delta VR$ or $\Delta fP/\Delta fR$). The push state is calculated by comparing the input quantity to the idle quantity level Qidle (either Vidle or fidle)+/−the threshold values $\Delta QP$ and $\Delta QR$.

The algorithm prevents from fast state toggling (around the decision threshold) by using a "release" decision threshold (Q0>Qidle+$\Delta QP$) different from "pressed" decision threshold (Q0<Qidle+$\Delta QR$). $\Delta QR$ is defined to be always less than $\Delta QP$ for generating a hysteresis filter to take into account the signal behavior when the push is released. Thus, the scheduling of the associated task is compliant with a high reactivity of the system (for instance, an activation detection can be done in less than 20 ms).

FIG. 8 shows a system comprising four neighboring push buttons and which algorithm is above described in relation with the third embodiment in FIG. 5. Indeed, the present could be extended for several pushes of the tactile pressure sensor kind. Although, the present description was directed to a single push button, it can be extended to a more complex mechanic system with several pushes located near one from the other. The problem in this kind of system with several pushes is not to activate all the pushes when the user presses on only one button, i.e. button 3 in the represented example. The known common solution is to make a mechanic structure with mechanical isolation or with a big distance between each push, so that the force apply on one push has no effect on the other pushes. Such solution is not admissible since it results in a much bigger mechanical volume of the system than needed.

To let the system less sensitive to the mechanic influence between each pushes, it is proposed to make a quantity characterization (either voltage or frequency) of the mechanic structure from one push to the other, all over the range of strength used by the system and implement it on the software. With this characterization, the software knows the influence that has the pressure of one push on all the other pushes and can correct it accordingly. Thus, if the user presses the push button 3, with the table of influence given by the quantity characterization, the software can correct the thresholds ($\Delta VP$, $\Delta VR$ or $\Delta fP$, $\Delta fR$) or the idle quantity (Vidle or fidle) of the other pushes. As the threshold level of the other pushes has changed, the software let them inactive, i.e. as being in a released state. The software knows the push on which the user is pressing, by calculating the higher gap between its input quantity and its idle quantity level. As the system is not linear, this calculation has to be preferably corrected according to its idle quantity.

Having described the invention with regard to certain specific embodiments, it is to be understood that these embodiments are not meant as limitations of the invention. Indeed, various modifications, adaptations and/or combination between embodiments may become apparent to those skilled in the art without departing from the scope of the annexed claims.

The invention claimed is:

1. A system for detecting activation of a tactile pressure sensor, said system comprising:
   a tactile pressure sensor operable to exhibit a resistance that corresponds to a force applied to the sensor;
   a microprocessor equipped with an analog to digital converter suitable to measure an input quantity indicative of the resistance of the sensor, said microprocessor configured to execute the steps of
   a) measuring periodically an input quantity of the sensor, when it is not pressed, a period for measuring periodically being set according to sensor dynamic requirements;
   b) computing a current idle quantity depending on the input quantity measured at step a);
   c) computing an activation threshold based on a quantity characterization of the sensor mechanic structure and the current idle quantity defined at step b), and a non-activation threshold to determine when the sensor is released after having been pressed, said non-activation threshold being strictly lower than the activation threshold;

d) comparing the sensor input quantity with a summation of a last defined idle quantity and the activation threshold computed in step c) in order to determine whether the sensor is pressed or not.

2. The system according to claim 1, wherein the quantity measured at step a) is the input frequency defining a current idle frequency at step b) and computing an activation threshold based on a frequency characterization of the sensor mechanic structure and depending on the idle frequency defined at step b).

3. The system according to claim 1, wherein the quantity measured at step a) is the input voltage defining a current idle voltage at step b) and computing an activation threshold based on a voltage characterization of the sensor mechanic structure and depending on the idle voltage defined at step b).

4. The system according to claim 1, wherein the period at step a) is dynamically set upon detection of environmental constraint changes.

5. The system according to claim 4, wherein the period is dynamically set to a fast period mode defined by a shorter period, when either a push has been detected as released or the idle quantity has dropped under a predetermined threshold.

6. The system according to claim 1, wherein the idle quantity in step b) is defined as the average value between the previous defined value of the idle quantity and the last measured input voltage in step a).

7. The system according to claim 1, wherein the quantity characterization of the sensor mechanic structure is made all over the range of strength used by sensor.

8. The system according to claim 1, wherein computation in step c) is based on an equation of the sensor behavior determined by the quantity characterization setting the activation threshold to be near the strength request for such activation.

9. The system according to claim 1, wherein computation in step c) is based on a correspondence table between the idle quantity determined at step b) and a corresponding activation threshold determined by the quantity characterization of the sensor mechanic structure.

10. The system according to claim 1, wherein the non-activation threshold is either directly based on the activation threshold or computed from the quantity characterization of the sensor mechanic structure.

11. The system according to claim 1, for detecting activation of a tactile pressure sensor among a plurality of tactile pressure sensors being mechanically dependent on each other's, wherein it further comprises the step of determining which sensor has been pressed by comparing for each sensor the gap between the sensor input quantity with the last defined idle quantity and selecting the sensor with the highest gap.

12. The system according to claim 11, wherein it further comprises the steps of calibrating each sensor and storing for each sensor a quantity deviation for a given force applied, said quantity deviation being used for computing the activation threshold at step b).

13. The system according to claim 11, wherein it further comprises the step of adjusting the actuation threshold based on a temperature characterization of each sensor mechanic structure.

14. The system according to claim 12, wherein each gap computation is adjusted by a predetermined coefficient for each sensor based on their stored quantity deviation and/or their temperature characterization.

* * * * *